Feb. 20, 1968         C. K. STRALOW ETAL         3,369,506
       METHOD AND APPARATUS FOR SHALLOW INCORPORATION
              OF HERBICIDES APPLIED TO ROW CROPS
Filed June 8, 1966                        3 Sheets-Sheet 1

INVENTORS.
CHARLES K. STRALOW
LYLE D. WADE
BY
*John C. Thompson*
ATTORNEY

FIG. 3
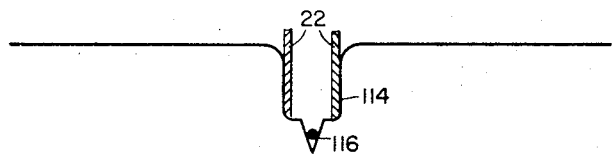
FIG. 4
FIG. 5
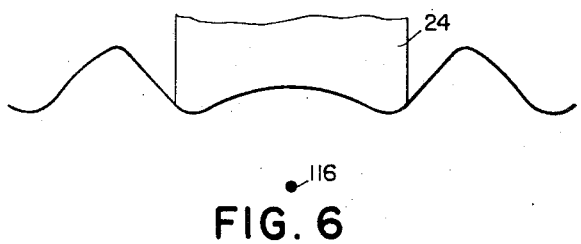
FIG. 6
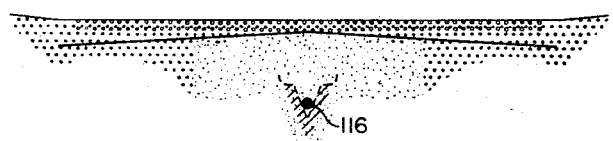
FIG. 7
FIG. 8
| TABLE I | |
|---|---|
| ░░░ | HERBICIDE |
| ●●● | LOOSE SOIL |
| ░░ | MEDIUM COMPACTED SOIL |
| ▨▨ | COMPACTED SOIL |
| ● | SEED |
*INVENTORS.*
CHARLES K. STRALOW
LYLE D. WADE
BY
*John C. Thompson*
ATTORNEY United States Patent Office 3,369,506
Patented Feb. 20, 1968

3,369,506
METHOD AND APPARATUS FOR SHALLOW INCORPORATION OF HERBICIDES APPLIED TO ROW CROPS
Charles Kenneth Stralow, East Moline, and Lyle Duane Wade, Moline, Ill., assignors to Deere & Company, Moline, Ill., a corporation of Delaware
Filed June 8, 1966, Ser. No. 556,091
7 Claims. (Cl. 111—6)

ABSTRACT OF THE DISCLOSURE

The present invention relates to an apparatus for incorporating a band of herbicide material into the surface of the soil up to a depth of approximately one-half inch. The desired results are achieved in the preferred manner by drawing a pair of flat angularly disposed blades through the surface of a properly prepared seedbed below a herbicide dispenser. The blades will cause a boiling action in the soil as they are drawn through it, the herbicide material being dispensed into the boiling soil whereby it is incorporated therein. The seedbed is properly prepared for incorporation by throwing up a hill after the seed has been deposited in its furrow, the hill then being compacted by a conventional press wheel whereby the soil will be substantially level after the herbicide material has been incorporated into it in the preferred manner.

BACKGROUND OF THE INVENTION

Various forms of herbicides have been developed in recent years for the control of weeds. These herbicides have varying characteristics and some give best results when deposited upon the surface of the soil, while with others it is necessary to incorporate them to varying depths. For example, 2-4-D will give best results when placed on the surface of the soil, since if the 2-4-D were placed close to the seed the germinating plant could be damaged. Treflan gives its best results when incorporated to a depth of two inches or more. Atrazine apparently gives its best results when incorporated to a depth of two inches since this chemical is apparently more effective when placed in contact with moist soil. Other herbicides such as Randox and Randox T apparently give their best results when incorporated in the upper one-half inch of the soil.

The herbicide material may be either broadcast or be placed in the row (if a row crop is being planted). Generally a row application of herbicide is customary due to the lower cost of this form of application.

While prior art devices are known which will incorporate herbicides in the row, to date no satisfactory device has been developed for shallow incorporation up to one-half inch in most soil conditions.

OBJECTS

One object of this invention is to provide an improved method for incorporating herbicide materials into the surface of the soil to be treated in which after the seed has been placed in its furrow a hill is thrown over the furrow and compacted, the method including the further steps of dispensing a band of herbicide over the compacted soil and incorporating the herbicide into the surface of the soil by drawing soil agitating means through the soil to cause the soil to boil and incorporate the dispensed herbicide material.

A further object of this invention is to provide an apparatus for performing the foregoing method in which blade means are provided that are adapted to be drawn through the surface of the soil below a herbicide dispensing means.

A still further object of this invention is to provide an apparatus having disk hilling means disposed between a press wheel and seed furrow opener to throw dirt over the furrow, said apparatus also being provided with blade means disposed below herbicide dispensing means and to the rear of the press wheel means, the blade means being adapted to work the surface of the soil to incorporate herbicide into the surface of the soil and also to form a level seedbed of loose soil which will reduce press wheel crusting thereby aiding seed emergence, reduce soil erosion, and provide for better mechanical cultivation.

Another object of this invention is to provide a pair of angularly disposed incorporating blades disposed behind a planter press wheel, the blades being carried by pivoted spring-biased mounting means whereby the blades can swing rearwardly should they encounter an obstruction as the unit is propelled forwardly.

Another object of this invention is to provide means for incorporating a herbicide into the surface of the soil which is suitable for substantially all soil conditions and which is of low cost, reliable operation, and is easy to assemble.

These and other objects and advantages of this invention will be apparent to those skilled in the art after a consideration of the following detailed description, taken in conjunction with the accompanying drawings in which the preferred form of this invention is illustrated.

DRAWINGS

FIGS. 3-6 are somewhat enlarged schematic sectional views taken along the lines 3—3, 4—4, 5—5, and 6—6 in FIG. 2 showing the soil profile.

FIG. 7 is a somewhat enlarged sectional view along the line 7—7 in FIG. 2 showing the nature of the soil after the herbicide material has been incorporated.

FIG. 8 is a table of the graphical drawing symbols used in FIGS. 4-7.

DETAILED DESCRIPTION OF THE INVENTION

In the following description right-hand and left-hand reference is determined by standing to the rear of the seed planter and facing the direction of travel.

Figure 1:
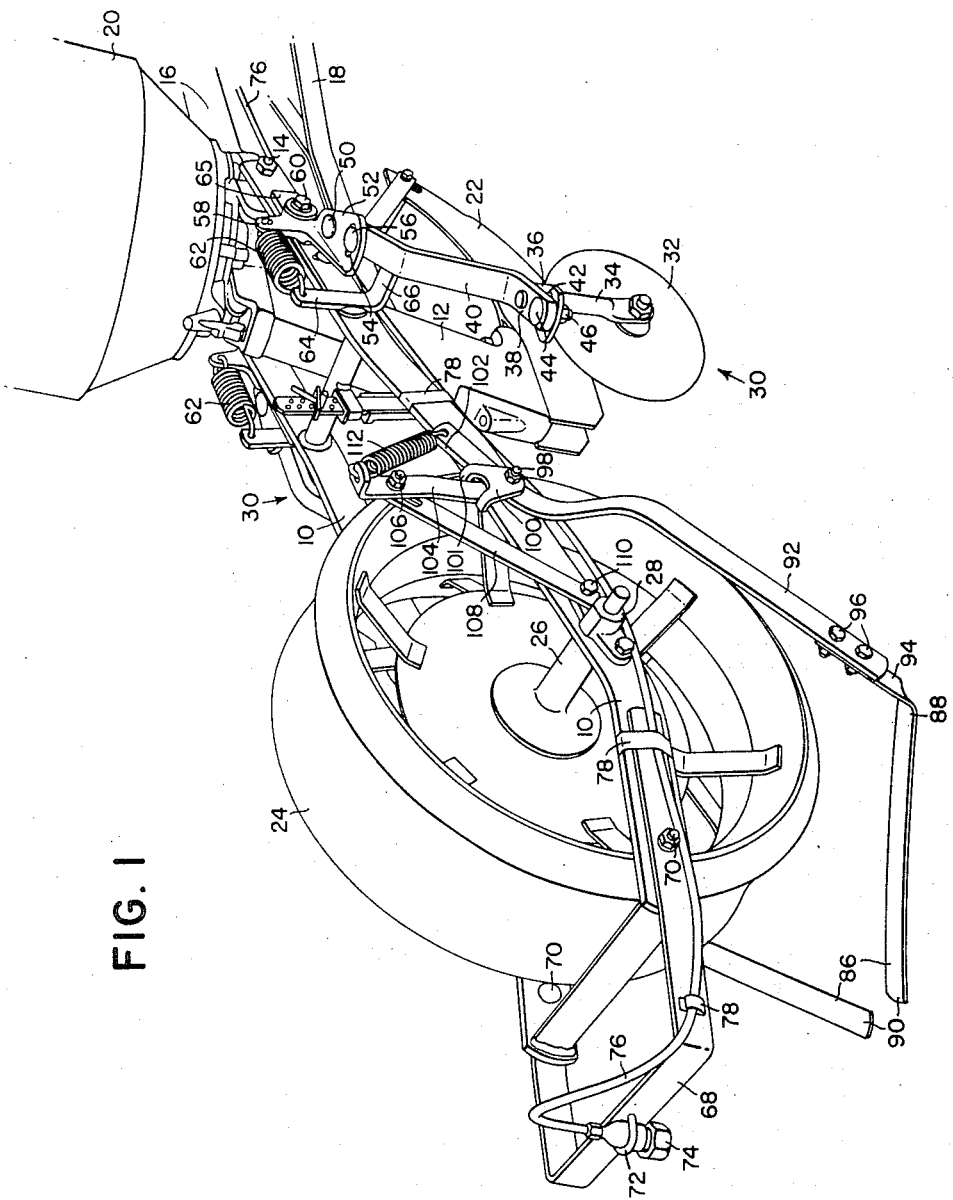
FIG. 1 is a perspective view of a portion of a planter in which the principles of the present invention have been incorporated, the planter being provided with means for dispensing a liquid herbicide to the rear of a press wheel.
Figure 2:
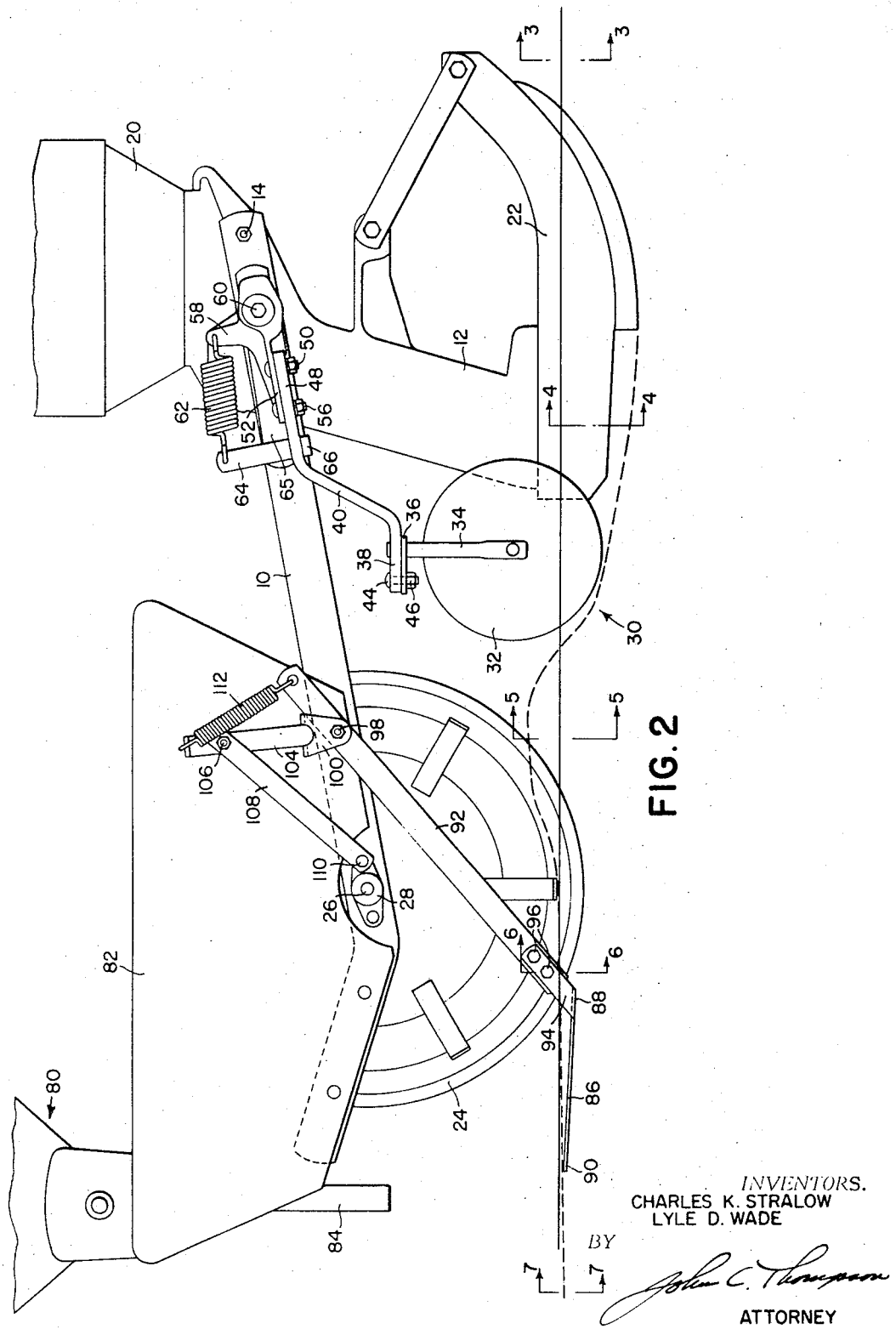
FIG. 2 is a side view of a planter similar to the one shown in FIG. 1 in which means for dispensing dry herbicide material are mounted to the rear of the press wheel. This figure also illustrates the normal ground line (shown in full lines) and the profile of the soil in the center of the row (shown in broken lines) at various stages of the planting and herbicide dispensing operation.

Referring first to FIGS. 1 and 2 a portion of a generally conventional seed planter is illustrated, the seed planter having a longitudinally extending planter frame which includes right-hand and left-hand longitudnally extending links 10 which are pivotally secured at their forward end to a seed boot 12 by means of pivot bolts 14 (only one of which is shown). Forwardly extending upper and lower generally parallel links 16, 18 (FIG. 1) secure the seed boot to a generally transversely extending framework in the manner more fully disclosed in U.S. Patent 3,059,705 to W. P. Oehler et al. granted Oct. 13, 1962. A seed hopper 20 having seed dispensing means mounted therein is mounted on the seed boot 12, and conventional furrow opening means 22 are secured to the seed boot in the manner well known to the art.

A press wheel 24 is carried by axle means 26 that is rotatably journalled within a bearing block 28 that is bolted or otherwise rigidly secured to the right- and left-hand longitudinally extending links 10.

Mounted on the forward ends of the right- and left-hand longitudinally extending links is a pair of right- and left-hand disk hilling means indicated generally at 30. Each disk hiller includes a disk 32 which is rotatably secured to a downwardly projecting stud 34. The stud 34 carries an apertured radially extending flange 36 at its upper portion and is also rotatably disposed within a horizontal portion 38 of a depending arm 40. The flange 36 is provided with an arcuate slot 42, and a bolt 44 and nut 46 secure the disk 32 in various positions of angular adjustment relative to the arm 40. The upper forward portion 48 of the arm 40 is provided with a pair of apertures, the forward aperture receiving a fastener 50 that is disposed within a forward aperture on a flat triangular plate 52, the plate 52 also having an arcuate rear aperture 54 through which a fastener 56 may be passed to secure the arm 40 in various positions of angular adjustment relative to the plate 52. The triangular plate 52 is formed integrally with a vertically disposed section 58 that is secured by means of a pivot bolt 60 to the arms 10. A tension spring 62, having one end carried by an L-shaped member 64 engages the arm 58 of the bell crank 52, 58 and normally biases the disk 32 downwardly. The L-shaped member is carried by a strap 65 which is in turn secured to the arm 10. An outwardly projecting portion 66 of the L-shaped member 64 engages the arm 40 and limits its downward movement.

Referring now specifically to the modification shown in FIG. 1, a rearwardly projecting frame 68 is secured by means of fasteners 70 to the right- and left-hand links 10. A conventional U-bolt 72 is mounted on the bight portion of the frame 68 and holds a spray nozzle 74. The nozzle 74 receives spray material from a source of fluid herbicide material under pressure on a portion of the propelling vehicle, not shown, through conduit means 76 which is secured to the frames in appropriate places by clips 78.

Referring now to the modification shown in FIG. 2, a herbicide dispenser 80, such as the type shown in U.S. Patent 3,178,079 to L. W. Johnson issued Apr. 13, 1965, is shown mounted on a press wheel fender 82 to the rear of the press wheel 24. The dispenser 80 is in communication with a herbicide diffuser 84 and is driven from the press wheel in the manner shown in the aforesaid patent.

Mounted behind the press wheel 24 and below the herbicde dispensing means 74 and 84 is a pair of incorporating blades 86. Each of these blades is adapted to be normally disposed below the surface of the soil when planting with the forward end being disposed slightly below the rearward end as can best be seen from FIG. 2. As can be seen from FIG. 1, the blades are disposed at an angle to the longitudinally extending planter frame with the forward ends 88 being disposed well outward of the press wheel while the inner ends 90 are disposed closely adjacent each other. The blades are flat and normally disposed so that the flat surface is substantially horizontal to ground surface. Each of the incorporating blades is secured to the longitudinally extending frame by a downwardly extending arm 92 to which an upwardly extending portion 94 of the blade is secured by means of fasteners 96, an upper portion of the arm 92 being secured to the right and left longitudinally extending links 10 by means of pivot bolts 98. A bifurcated L-shaped member 100 is disposed over the arm 92 and the forward leg 101 of the member 100 is adapted to contact the upper forward edge 102 (FIG. 1) of the arm 92 to limit its downward movement. The member 100 can be adjusted by moving the upstanding link 104 forwardly or rearwardly about the pivot bolt 98 and securing it in its desired position by means of the fastener 106 which will secure the link 104 to the arm 108 which is pivotally secured to the bearing block 28 by means of a pivot 110. A spring 112 is secured at one end to an aperture in the forward end of the arm 92 and at its other end to an aperture in the upper end of the link 104, the spring normally biasing the incorporating blades 86 downwardly in such a manner that the upper edge portion 102 of the arm 92 contacts the bifurcated L-shaped member 100, the springs however permitting swinging movement to the rear should the blades encounter an obstruction as the planter unit is being propelled forwardly.

OPERATION

The operation of the apparatus shown in FIGS. 1 and 2 can best be understood from FIGS. 3–7. FIG. 3 represents the normal ground line, the ground having previously been loosened for planting. As the planting and incorporating apparatus is propelled forwardly over the surface of the ground 113, a furrow 114 will be formed within the ground by contacting the soil. A seed 116 will then be deposited within the furrow. In order to provide for a level seedbed, it is necessary to throw loose soil over the furrow which is done by means of the disk hillers 32, the soil having a transverse profile, as shown in FIG. 5, just prior to being compacted by the press wheel 24, as shown in FIG. 6. As the leveling blades are drawn through the soil, they will cause the soil to boil over the blades and to level out. The herbicide material is dispensed into the boiling soil and is incorporated within the top surface of the soil up to a depth of one-half inch.

It can be seen from the foregoing that the apparatus of this invention incorporates both liquid and granular herbicides up to a depth of one-half inch and also levels the soil over and next to the row which in turn will allow better mechanical cultivation, will reduce press wheel crusting of the soil aiding in seed emergence, and will also reduce soil erosion caused by the press wheel track forming a water furrow for wash.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. In a planting apparatus having a longitudinally extending planter frame adapted to be propelled forwardly over the ground, means carried by said frame to open a furrow in the ground when said frame is propelled forwardly, seed dispensing means carried by said frame and operable to place seed within the furrow, press wheel means mounted on the frame behind said furrow opener and operable to compact earth over said seed, and herbicide dispensing means operatively associated with said press wheel and operable to place herbicide material onto the soil, the improvement comprising: incorporating means disposed below said dispensing means and behind and in line with said press wheel and operable to incorporate herbicide into the soil above the planted seed, said incorporating means including elongated blade means generally flat in cross section, and means interconnecting the blade with the planter frame to hold the blade generally stationary with the flat cross section surface generally parallel to and below the surface of the ground.

2. The planting apparatus set forth in claim 1 in which said blade means are disposed at an angle to the planter frame.

3. The planting apparatus set forth in claim 1 in which said blade means include a pair of angled blades whose forward ends are disposed outwardly of the sides of said press wheel and whose rear ends are disposed closely adjacent each other to the rear of the press wheel.

4. The planting apparatus set forth in claim 3 in which the rearward ends of said blades are disposed slightly above the forward ends.

5. The planting apparatus set forth in claim 1 in which said incorporating blade means includes right and left mounting structures carried by the frame on opposite sides of said press wheel, said blade means further including right and left generally horizontally disposed blades secured to the right and left mounting structures for spring resisted upward and rearward movement.

6. The planting apparatus set forth in claim 5 in which each of the mounting structures includes transversely extending pivot means secured to said longitudinally extending frame, arm means having an intermediate portion journalled about said pivot means, said blades being secured to one end of said arm means, stop means mounted on said longitudinally extending frame, and spring means normally biasing said arm means into engagement with said stop means.

7. The planting apparatus set forth in claim 1 in which disk hilling means is carried by said longitudinally extending frame to the rear of said seed dispensing means, said disk hiller throwing dirt over said furrow when said frame is propelled forwardly.

References Cited
UNITED STATES PATENTS

| | | | |
|---|---|---|---|
| 2,629,351 | 2/1953 | Wenger | 111—60 |
| 2,881,848 | 4/1959 | Liston | 172—438 X |
| 3,032,124 | 5/1962 | Herring et al. | 172—642 |
| 3,110,275 | 11/1963 | Bonney | 111—70 X |
| 3,157,139 | 11/1964 | Spindler | 111—7 |
| 3,220,368 | 11/1965 | Gandrud | 111—9 |
| 2,387,748 | 10/1945 | Cuddigan et al. | 172—720 X |

OTHER REFERENCES

Operator's Manual, OM–B–68–1059, received Dec. 15, 1959, John Deere Pre-Emergence Sprayer.

ROBERT E. BAGWILL, *Primary Examiner.*